United States Patent
Hakura et al.

(10) Patent No.: US 8,749,564 B2
(45) Date of Patent: Jun. 10, 2014

(54) BARRIER COMMANDS IN A CACHE TILING ARCHITECTURE

(71) Applicant: NVIDIA Corporation, Santa Clara, CA (US)

(72) Inventors: Ziyad S. Hakura, Gilroy, CA (US);
Dale L. Kirkland, Madison, AL (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/935,389

(22) Filed: Jul. 3, 2013

(65) Prior Publication Data

US 2014/0118362 A1    May 1, 2014

Related U.S. Application Data

(60) Provisional application No. 61/719,271, filed on Oct. 26, 2012.

(51) Int. Cl.
*G06T 1/00*   (2006.01)
*G06T 15/00*  (2011.01)
*G06F 15/00*  (2006.01)

(52) U.S. Cl.
USPC .......................................... 345/522; 345/501

(58) Field of Classification Search
USPC ................................................. 345/501, 522
See application file for complete search history.

(56) References Cited

U.S. PATENT DOCUMENTS

| | | | |
|---|---|---|---|
| 6,323,860 B1 | 11/2001 | Zhu et al. | |
| 6,535,209 B1 | 3/2003 | Abdalla et al. | |
| 6,697,063 B1 | 2/2004 | Zhu et al. | |
| 7,170,515 B1 | 1/2007 | Zhu et al. | |
| 2010/0110089 A1* | 5/2010 | Paltashev et al. | 345/522 |
| 2012/0198214 A1* | 8/2012 | Gadre et al. | 712/225 |

* cited by examiner

*Primary Examiner* — Jacinta M Crawford
(74) *Attorney, Agent, or Firm* — Patterson & Sheridan, LLP

(57) ABSTRACT

One embodiment of the present invention includes a graphics subsystem. The graphics subsystem includes a first processing entity and a second processing entity. Both the first processing entity and the second processing entity are configured to receive first and second batches of primitives, and a barrier command in between the first and second batches of primitives. The barrier command may be either a tiled or a non-tiled barrier command. A tiled barrier command is transmitted through the graphics subsystem for each cache tile. A non-tiled barrier command is transmitted through the graphics subsystem only once. The barrier command causes work that is after the barrier command to stop at a barrier point until a release signal is received. The back-end unit transmits a release signal to both processing entities after the first batch of primitives has been processed by both the first processing entity and the second processing entity.

23 Claims, 9 Drawing Sheets

United States Patent
US 8,749,564 B2

BARRIER COMMANDS IN A CACHE TILING ARCHITECTURE

CROSS-REFERENCE TO RELATED APPLICATIONS

This application claims benefit of U.S. provisional patent application Ser. No. 61/719,271, filed Oct. 26, 2012 and titled "An Approach for Tiled Caching." The subject matter of this related application is hereby incorporated herein by reference.

BACKGROUND OF THE INVENTION

1. Field of the Invention

Embodiments of the present invention relate generally to graphics processing and, more specifically, to barrier commands in a cache tiling architecture.

2. Description of the Related Art

Some graphics subsystems implement a tiling architecture that divides a render target into partitions referred to as tiles. Such graphics subsystems rearrange work provided to the graphics subsystem so that work associated with any particular tile remains in an on-chip cache for a longer time than with an architecture that does not rearrange work in this manner. This rearrangement helps to improve memory bandwidth as compared with a non-tiling architecture. Multiple processing entities may be provided to process the tiles in parallel for improved performance.

Oftentimes, work executing in a graphics pipeline includes a first batch of work that is dependent on the results of a second batch of work. In such a case, if the graphics pipeline were to begin processing the first batch of work before the second batch of work is fully processed, then the results of the first batch of work would not be accurate. Among other things, those results would not be properly based on the final results from the second batch of work. In such situations, the graphics pipeline needs to be configured to honor these data dependencies.

In one traditional approach to managing data dependencies between multiple batches of work, a first batch of work is processed and all other work is stalled. When the first batch of work is completed, the other work is resumed. However, this approach incurs a large performance penalty because no work other than the work being processed may proceed. Managing data dependencies is made more complicated by a graphics architecture includes multiple processing entities operating in parallel because the data dependencies can exist across the multiple processing entities. For example, work to be processed in a first processing entity may be dependent on work being processed by a second processing entity.

As the foregoing illustrates, what is needed in the art is a technique for managing data dependencies in a tiling architecture that includes multiple processing entities that process work related to the different tiles in parallel.

SUMMARY OF THE INVENTION

One embodiment of the present invention sets forth a graphics subsystem. The graphics subsystem includes a first processing entity and a second processing entity. Both the first processing entity and the second processing entity are configured to receive first and second batches of primitives, and a barrier command in between the first and second batches of primitives. The barrier command causes work that is after the barrier command to stop at a barrier point until a release signal is received from a back-end unit, which is also included in the graphics subsystem. The back-end unit transmits a release signal to both processing entities after the first batch of primitives has been processed by both the first processing entity and the second processing entity.

One embodiment of the present invention sets for a computing device. The computing device includes a graphics subsystem. The graphics subsystem includes a first processing entity and a second processing entity. Both the first processing entity and the second processing entity are configured to receive first and second batches of primitives, and a barrier command in between the first and second batches of primitives. The barrier command causes work that is after the barrier command to stop at a barrier point until a release signal is received from a back-end unit, which is also included in the graphics subsystem. The back-end unit transmits a release signal to both processing entities after the first batch of primitives has been processed by both the first processing entity and the second processing entity.

One embodiment of the present invention sets for a method for rendering graphics. The method includes processing a first initial batch of primitives in a first processing entity. The method also includes transmitting a first barrier command downstream after processing the first initial batch of primitives. The method further includes processing a first subsequent batch of primitives in response to receiving a release signal in the first processing entity. The method also includes transmitting the release signal to the first processing entity in response to receiving the first barrier command from the first processing entity.

One advantage of the disclosed graphics pipeline is that the graphics pipelines are configured to honor data dependencies between different batches of work. Another advantage is that units within the graphics pipelines that are upstream of the barrier point are allowed to process work in normal course and are not stalled. Thus, some amount of work can still be processed within the different graphics pipelines while the downstream data dependencies are sorted out, thereby increasing overall processing efficiency relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
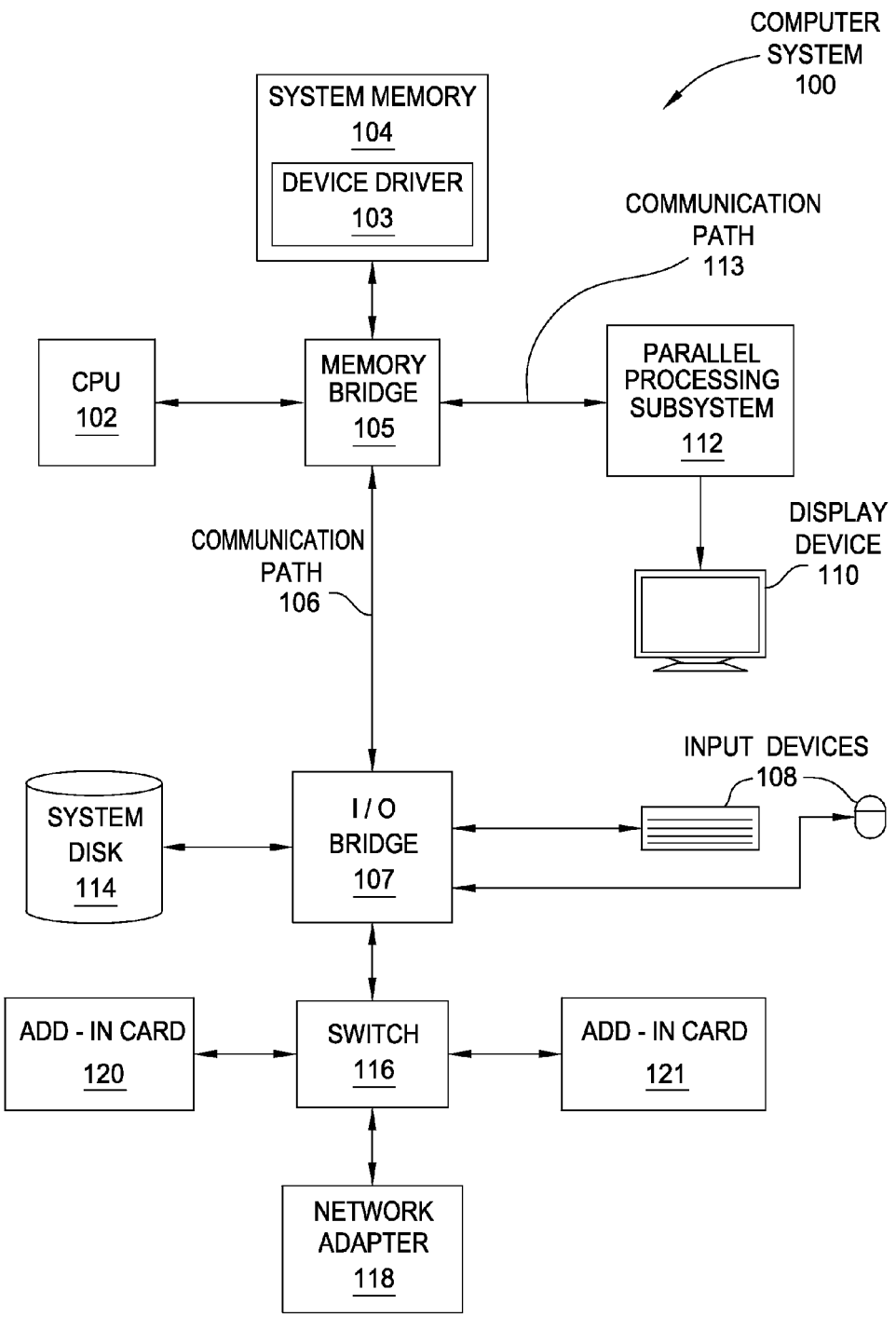
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
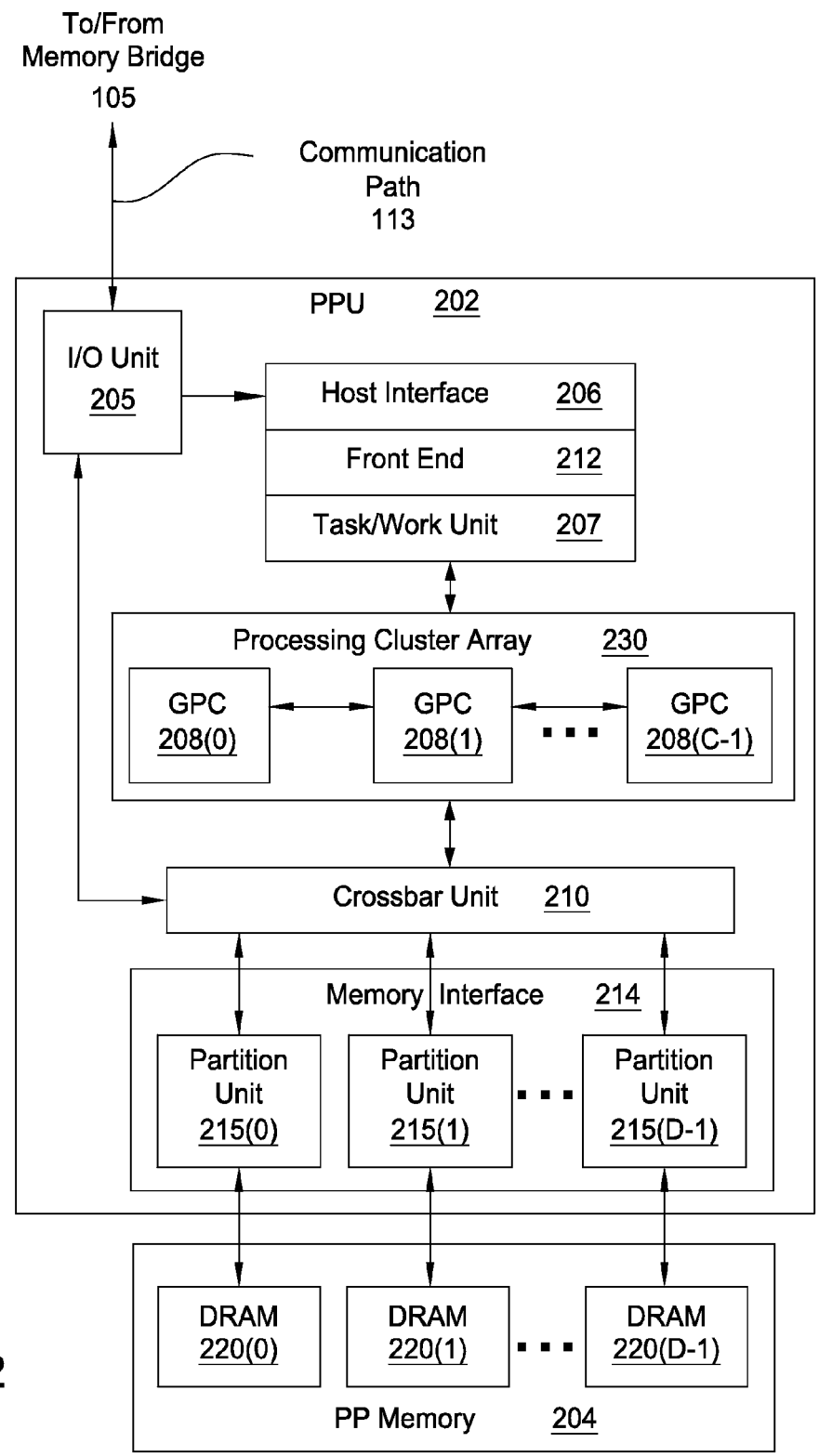
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well.

Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
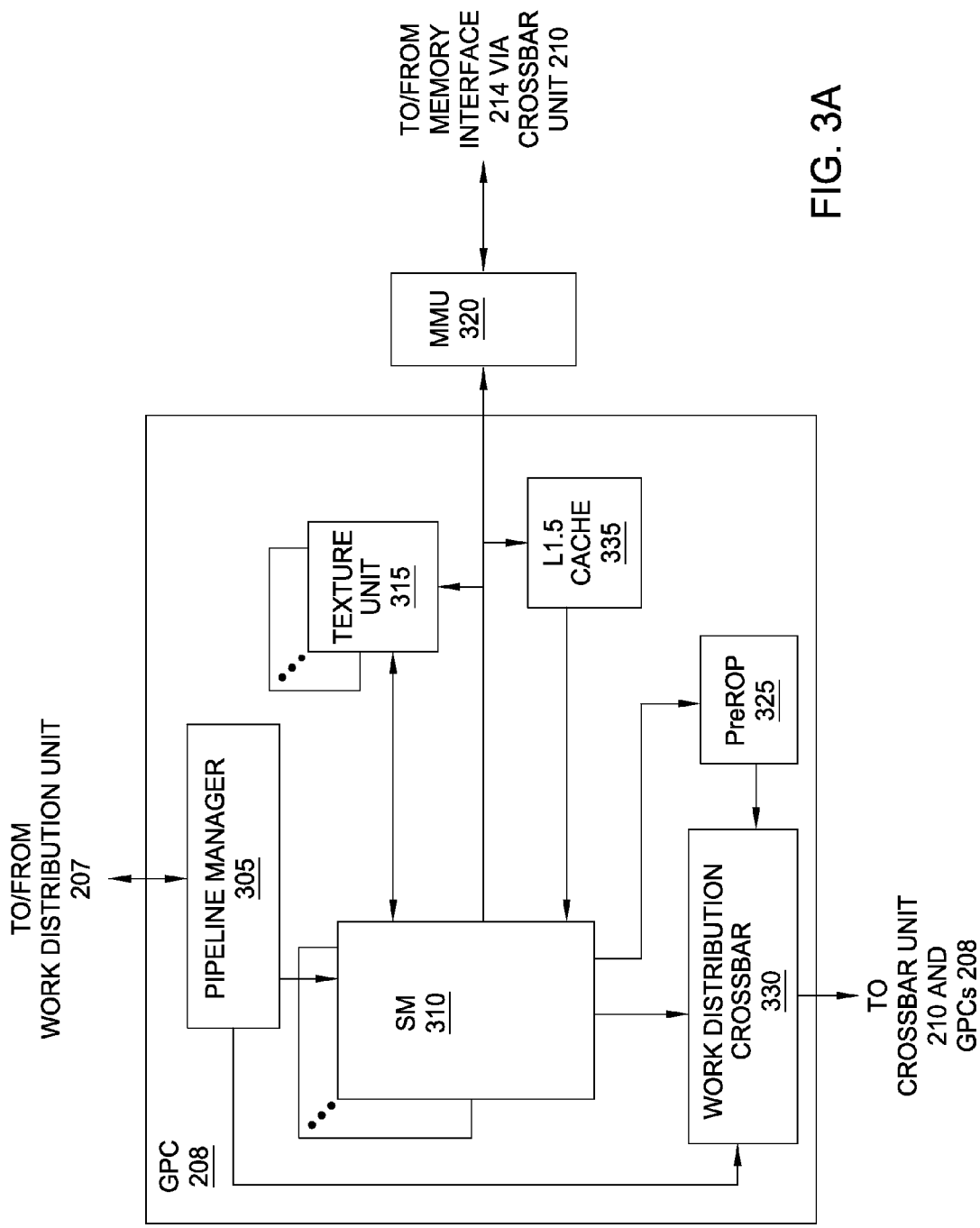
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
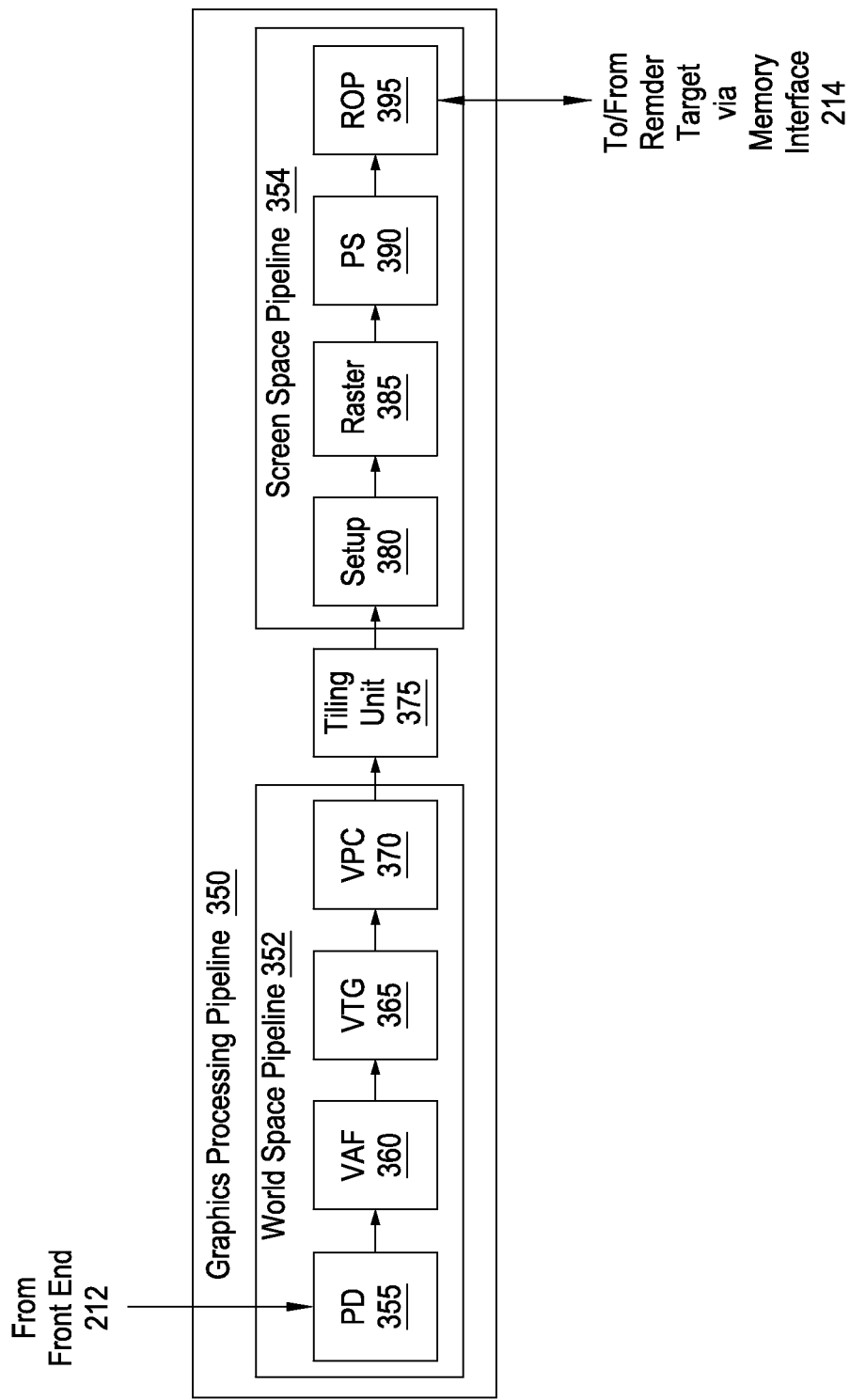
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world space pipeline 352 and a screen space pipeline 354, as further described herein. Graphics primitives are processed in the world space pipeline 352 and then transmitted to the tiling unit 375. The screen space is divided into cache tiles, where each cache tile is associated with a portion of the screen space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world space pipeline 352, but are then transmitted multiple times to the screen space pipeline 354.

Such a technique improves cache memory locality during processing in the screen space pipeline 354, where multiple memory operations associated with a first cache tile access a region of the L2 caches, or any other technically feasible cache memory, that may stay resident during screen space processing of the first cache tile. Once the graphics primitives associated with the first cache tile are processed by the screen space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen space processing of the second cache tile. Accordingly, the overall memory traffic to the L2 caches and to the render targets may be reduced. In some embodiments, the world space computation is performed once for a given graphics primitive irrespective of the number of cache tiles in screen space that intersects with the graphics primitive.

The setup unit 380 receives vertex data from the VPC 370 via the tiling unit 375 and calculates parameters associated with the graphics primitives, including, without limitation, the color values, surface normal vectors, and transparency values at each vertex of the graphics primitive. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world space pipeline 352 and a screen space pipeline 354. The world space pipeline 352 processes graphics objects in 3D space, where the position of each graphics object is known relative to other graphics objects and relative to a 3D coordinate system. The screen space pipeline 354 processes graphics objects that have been projected from the 3D coordinate system onto a 2D planar surface representing the surface of the display device 110. For example, the world space pipeline 352 could include pipeline stages in the graphics processing pipeline 350 from the PD 355 through the VPC 370. The screen space pipeline 354 could include pipeline stages in the graphics processing pipeline 350 from the setup unit 380 through the ROP 395. The tiling unit 375 would follow the last stage of the world space pipeline 352, namely, the VPC 370. The tiling unit 375 would precede the first stage of the screen space pipeline 354, namely, the setup unit 380.

In some embodiments, the world space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
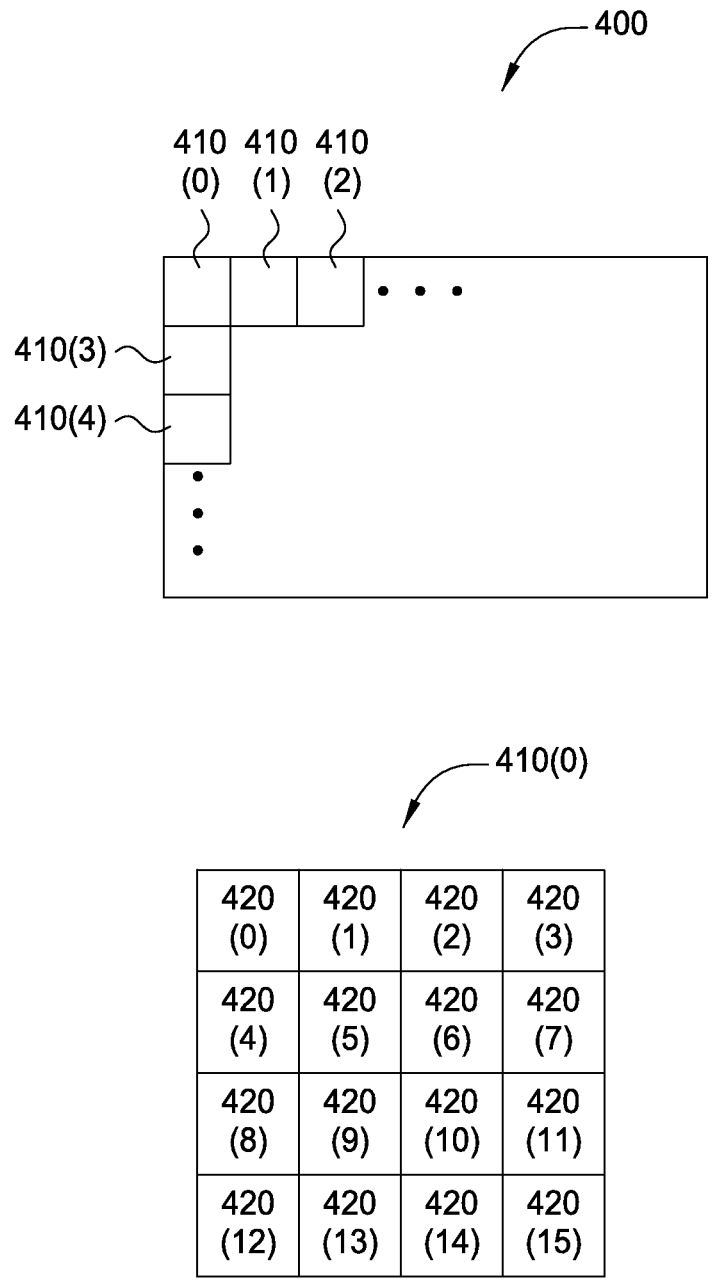
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen space 400 and is divided into multiple raster tiles 420.

The screen space 400 represents one or more memory buffers configured to store rendered image data and other data transmitted by functional units within the graphics processing pipeline 350. In some embodiments, the one or more memory buffers may be configured as one or more render targets. The screen space represents a memory buffer configured to store the image rendered by the graphics processing pipeline. The screen space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen space. In operation, once rendering completes, the pixels in the one or more render targets may be transmitted to a display device in order to display the rendered image.

By way of example, a set of render targets for the screen space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen space 400. For clarity, only five cache tiles 410(0)-410(4) are shown in FIG. 4. In some embodiments, cache tiles may have an arbitrary size in X and Y screen space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Barrier Commands in Tile Architecture

FIGS. 5-8 illustrate aspects of a graphics subsystem that implements a cache tiling architecture and is configured to honor data dependencies via barrier commands. Barrier commands allow work issued prior to the barrier command to proceed down the graphics pipeline as normal. The barrier command prevents work issued after the barrier command from being transmitted past a certain point in the graphics pipeline (referred to herein as a "barrier point"). The graphics subsystem resumes processing work issued after the barrier command once the graphics pipeline has substantially finished processing the work issued prior to the barrier command. Non-tiled barrier commands partition the work to honor data dependencies without regard to cache tile delineations. Tiled barrier commands are inserted into every cache tile, and thus cause work related to each individual cache tile to be partitioned. These distinctions are discussed in more detail below in conjunction with FIGS. 5-8.

Figure 5:
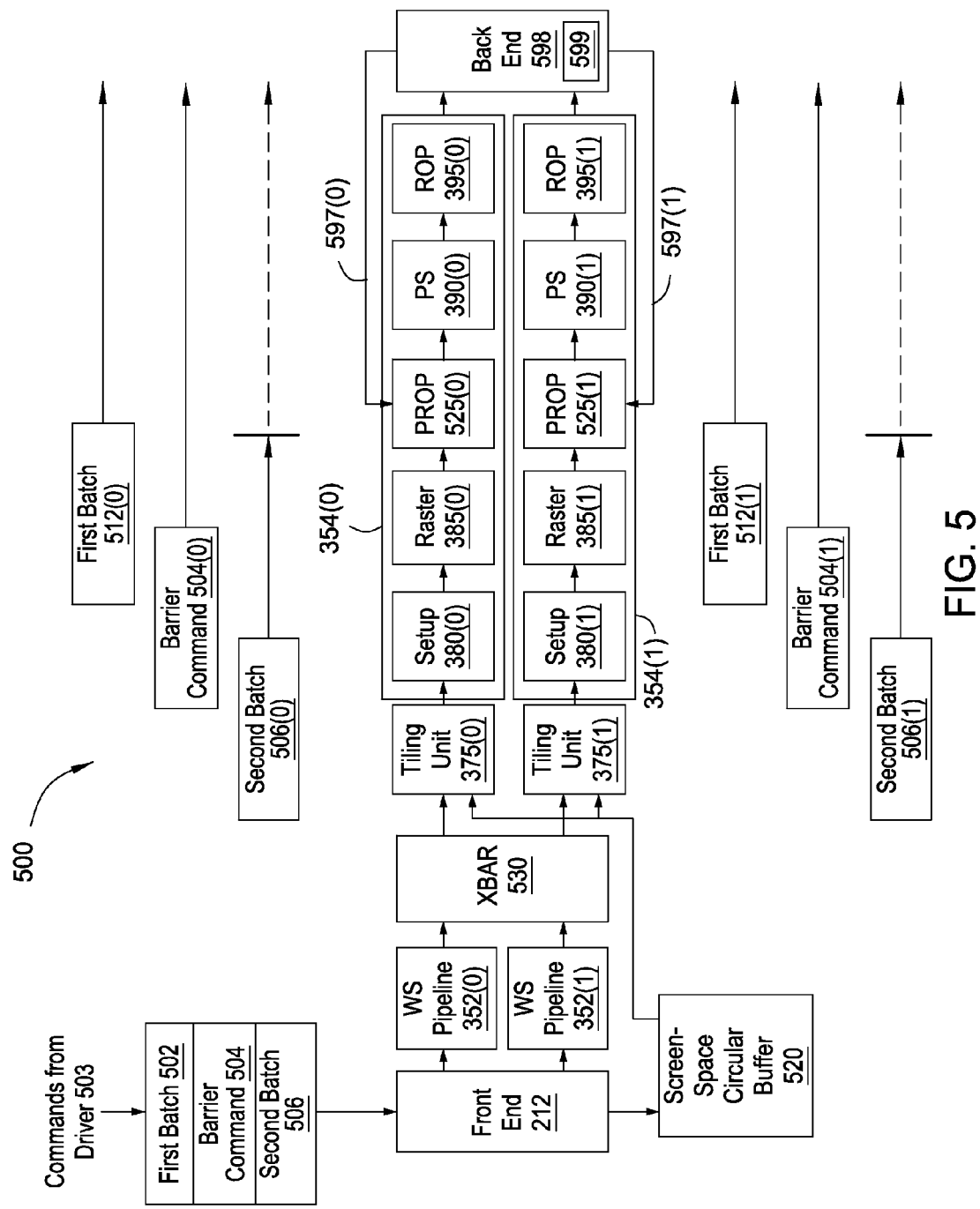
FIG. 5 illustrates a graphics subsystem configured to implement non-tiled barrier functionality, according to one embodiment of the present invention.

FIG. 5 illustrates a graphics subsystem 500 configured to implement non-tiled barrier functionality, according to one embodiment of the present invention. As shown, the graphics subsystem 500 includes a front end unit 212, a first world-space pipeline 352(0), a second world-space pipeline 352(1), a crossbar unit 530 ("XBAR"), a first tiling unit 375(0), a second tiling unit 385(1), a first screen-space pipeline 354(0), a second screen-space pipeline 354(1), and a back-end unit 598.

Each of the pipeline units (i.e., the world-space pipeline 352, setup 380, rasterizer 385, pixel shader 390, and ROP 395) depicted in FIG. 5 functions in a similar manner as described above with respect to FIGS. 1-4. The pre-raster operations unit ("PROP") 525, not depicted in FIG. 3B, is a unit that is configured to perform, among other things, early z-testing, optimizations for color blending, and address translations.

As shown, the graphics subsystem 500 includes at least two instances of the screen-space pipeline 354 and the world-space pipeline 352, for increased performance. The graphics subsystem 500 also includes a crossbar unit 530 for transmitting work output from the first world-space pipeline 352(0) and the second world-space pipeline 352(1) to the first tiling unit 375(0) and the second tiling unit 375(1). Although depicted in FIG. 5 with two instances of the world-space pipeline 352 and the screen-space pipeline 354, the teachings provided herein apply to graphics pipelines having any number of world-space pipelines 352 and screen-space pipelines 354.

The functionality of the world-space pipelines 352 and the screen-space pipelines 354 are implemented by processing entities such as general processing clusters (GPC) 208, described above. In one embodiment, the first world-space pipeline 352(0) may be implemented in a first GPC 208(0) and the second world-space pipeline 352(1) may be implemented in a second GPC 208(1). As a general matter, each screen-space pipeline 352 may be implemented in a different GPC 208, and in a similar fashion, each world-space pipeline 354 may be implemented in a different GPC 208. Further, a given GPC 208 can implement a world-space pipeline 354 and also a screen-space pipeline 352. For example, the first GPC 208(0) may implement both the first world-space pipeline 352(0) and the first screen-space pipeline 354(0).

A front end unit 212 receives commands from a device driver 103 and schedules tasks for processing by the world-space pipeline 352. A back-end unit 598 receives data from the screen-space pipeline 354 and provides feedback through feedback pathway 597 to PROP 525. The back-end unit 598 includes a barrier command counter 599 for counting the number of barrier commands received by the back-end unit 598, as is discussed in more detail below. The functionality of the back-end unit 598 may be implemented in the front end unit 212, in which case the graphics subsystem 500 would include only the front end unit 212. A screen-space circular buffer 520 receives barrier commands from the front end unit 212 and stores the barrier commands for use by the tiling units 375. The screen-space buffer 520 is a memory construct that may be stored in a cache such as an L2 cache.

Operation of the graphics subsystem 500 is now described in the context of commands 503 transmitted from a device driver 103. The commands transmitted from the device driver 103 include a first batch of commands 502, a barrier command 504, and a second batch of commands 506. The first batch of commands 502 and second batch of commands 506 include commands for rendering primitives. At least some of the commands in the second batch of commands 506 are dependent on screen-space outputs, such as color values generated by the pixel shader 390 and ROP 395, associated with the first batch of commands 502. The non-tiled barrier command 504 is provided in the commands from the driver 503 between the first batch of commands 502 and the second batch of commands 506, in order to cause the graphics pipeline 550 to honor the data dependencies between the first batch of commands 502 and the second batch of commands 506.

In operation, the device driver 103 sends commands 503 to the front end unit 212, which distributes tasks to the first world-space pipeline 352(0) and the second world-space pipeline 352(1). The front end unit 212 also causes the barrier command 504 to be transmitted to a screen-space circular buffer 520 for subsequent access by the first tiling unit 375(0) and the second tiling unit 375(1) as discussed below. In one embodiment, the front end unit 212 assigns tasks to the first world-space pipeline 352(0) and the second world-space pipeline 352(1) in round-robin order. The first world-space pipeline 352(0) and second world-space pipeline 352(1) each process work associated with the first batch of commands 502 and work associated with the second batch of commands 506 and generate primitives, for processing by the first screen-space pipeline 354(0) and the second screen-space pipeline 354(1).

The first world-space pipeline 352 (0) and second world-space pipeline 352(1) each include a bounding box generator unit (not shown) that determines to which screen space pipeline—the first screen-space pipeline 354(0) or the second screen-space pipeline 354(1)—each primitive should be transmitted. The first world-space pipeline 352(0) and the second world-space pipeline 352(1) transmit each primitive, through the cross-bar unit 530, to either or both of the first screen-space pipeline 354(0) or the second screen-space pipeline 354(1) as specified by the bounding box generator. Both the first world-space pipeline 352(0) and the second world-space pipeline 352(1) may send primitives to either of the first screen-space pipeline 354(0) or the second screen-space pipeline 352(1), or both of the first screen-space pipeline 354(0) and the second screen-space pipeline 352(1), depending on which raster tiles 420 the primitives overlap.

Each tiling unit 375 is associated with a respective screen-space pipeline 354. Each tiling unit 375 thus receives primitives from the crossbar 530 destined to the corresponding screen-space pipeline 354 and transmits those primitives to the corresponding screen-space pipeline 354. For example, the first tiling unit 375(0) receives primitives destined for the first screen-space pipeline 354(0) and transmits the primitives to the first screen-space pipeline 354(0).

When the last primitive associated with the first batch of commands 502 is received by a tiling unit 375, the screen-space circular buffer 520 transmits the non-tiled barrier command 504 to the tiling unit 375. In response to receiving the non-tiled barrier command 504, the tiling unit 375 flushes. When a tiling unit 375 flushes, the tiling unit generates cache tile batches that each include primitives that overlap a cache tile and transmits those cache tile batches to the screen-space pipeline 354 associated with the particular tiling unit 375. Each cache tile batch thus includes primitives that overlap a different cache tile. The process of flushing is described in more detail below with respect to FIG. 6. After the tiling unit 375 flushes and transmits all primitives stored in the tiling unit 375 to the corresponding screen-space pipeline 354, the tiling unit 375 transmits the non-tiled barrier command 504 to the corresponding screen-space pipeline 354.

All primitives transmitted by a tiling unit 375 prior to the tiling unit 375 receiving the barrier command 504 are included in a first batch of primitives 512, while all primitives transmitted by the tiling unit 375 after the tiling unit receiving the barrier command 504 are included in a second batch of primitives 516. FIG. 5 depicts two first batches of primitives—512(0) and 512(1). First batch of primitives 512(0) corresponds to primitives transmitted by the first tiling unit 375(0), while first batch of primitives 512(1) corresponds to primitives transmitted by the second tiling unit 375(1). Similarly, second batch of primitives 516(0) corresponds to primitives transmitted by the first tiling unit 375(0) while second batch of primitives 516(1) corresponds to primitives transmitted by the second tiling unit 375(1). Finally, barrier command 504(0) is the non-tiled barrier command transmitted by the first tiling unit 375(0) while barrier command 504(1) is the non-tiled barrier command transmitted by the second tiling unit 375(1).

Each unit in the screen-space pipeline 354 processes the first batch of primitives 512 as described above with respect to FIG. 3B. Each unit in the screen-space pipeline 354 also forwards the barrier command 504 down the screen-space pipeline 354 after processing the first batch of primitives 512.

When the barrier command 504 arrives at PROP 525, PROP 525 sets a barrier flag that indicates that a non-tiled barrier command 504 has been received. When set, the barrier flag prevents work received after the barrier command 504 from proceeding past PROP 525 until the flag is cleared. Each PROP unit 525 sets a corresponding barrier flag independently. In other words, when the first PROP unit 525(0) receives the first barrier command 504(0), the first PROP unit 525(0) sets a corresponding barrier flag, but does not set the barrier flag corresponding to the second PROP unit 525(1).

After the tiling unit 375 flushes in response to receiving the barrier command 504, and transmits the barrier command 504 to the respective screen-space pipeline 354, the tiling unit then receives primitives in the second batch of primitives 516, which are associated with the second batch of commands 506. The tiling unit 375 generates cache tile batches for each of the primitives in the second batch of primitives 516, and transmits the cache tile batches to the corresponding screen space pipeline 354 as described above. The cache tile batches associated with the second batch of primitives 516 proceed down the screen-space pipeline 354 until these cache tile batches arrive at PROP 525. Because the barrier flag is set, PROP 525 does not allow these cache tile batches to proceed past PROP 525 until the barrier flag is cleared.

The work associated with the first batch of primitives 512 proceeds through the rest of the screen-space pipeline 354 until the screen-space pipeline 354 completes processing the work associated with the first batch of primitives 512. The screen-space pipeline completes processing the work associated with the first batch of primitives 512 when the pixel shader 390 and raster operation unit 395 have completed respective operations for the work associated with the first batch of primitives 512. As stated above, the barrier command 504 follows this work. When a barrier command 504 reaches the back-end unit 598, the back-end unit 598 increments a barrier command counter 599 to indicate that the back-end unit 598 has received a barrier command 504 from one of the screen-space pipelines 354.

If the barrier command counter 599 indicates that a barrier command 504 has been received from each of the screen-space pipelines 354, then the back-end unit 598 transmits a barrier release signal through feedback pathway 597, which causes both first PROP unit 525(0) and second PROP unit 525(1) to reset their corresponding barrier flags. Resetting the barrier flags causes both first PROP 525(0) and second PROP 525(1) to begin processing work received after the barrier command 504, including the work associated with the second batch of primitives 516.

If the barrier command counter 599 indicates that a barrier command 504 has been received from less than all of the screen-space pipelines 354, then the back-end unit 598 does not transmit a barrier release signal through feedback pathway 597 to the PROP unit 593, and both the first PROP unit 525(0) and the second PROP unit 525(1) continue to prohibit work received after the barrier command 504 from being processed or from proceeding past the first PROP unit 525(0) or the second PROP unit 525(1).

Thus, work associated with the second batch of primitives 516, and after the barrier command 504, cannot proceed past PROP 525 until all of the work associated with the first batch of primitives 512 has completed processing in both the first ROP 395(0) and the second ROP 395(1). Preventing work associated with the second batch of primitives 516 from proceeding past PROP 525 until all work associated with the first batch of primitives 512 allows any data dependencies between the first batch of primitives 512 and the second batch of primitives 516 to be honored. More specifically, all of the processing tasks associated with the first batch of primitives 512 are completed before any of the processing tasks associated with pixel shader 390 or ROP 395 are initiated for the second batch of primitives 516. Waiting to process the second batch of primitives 516 allows any work associated with the second batch of primitives 516 in either pixel shader 390 or ROP 395 that requires data from the results of processing the first batch of primitives 512 in either pixel shader 390 or ROP 395 to receive such data. One advantage of the non-tiled barrier command is that units within the graphics pipelines that are upstream of PROP 525 are allowed to process work associated with the second batch of primitives 516 in normal course and are not stalled.

Figure 6:
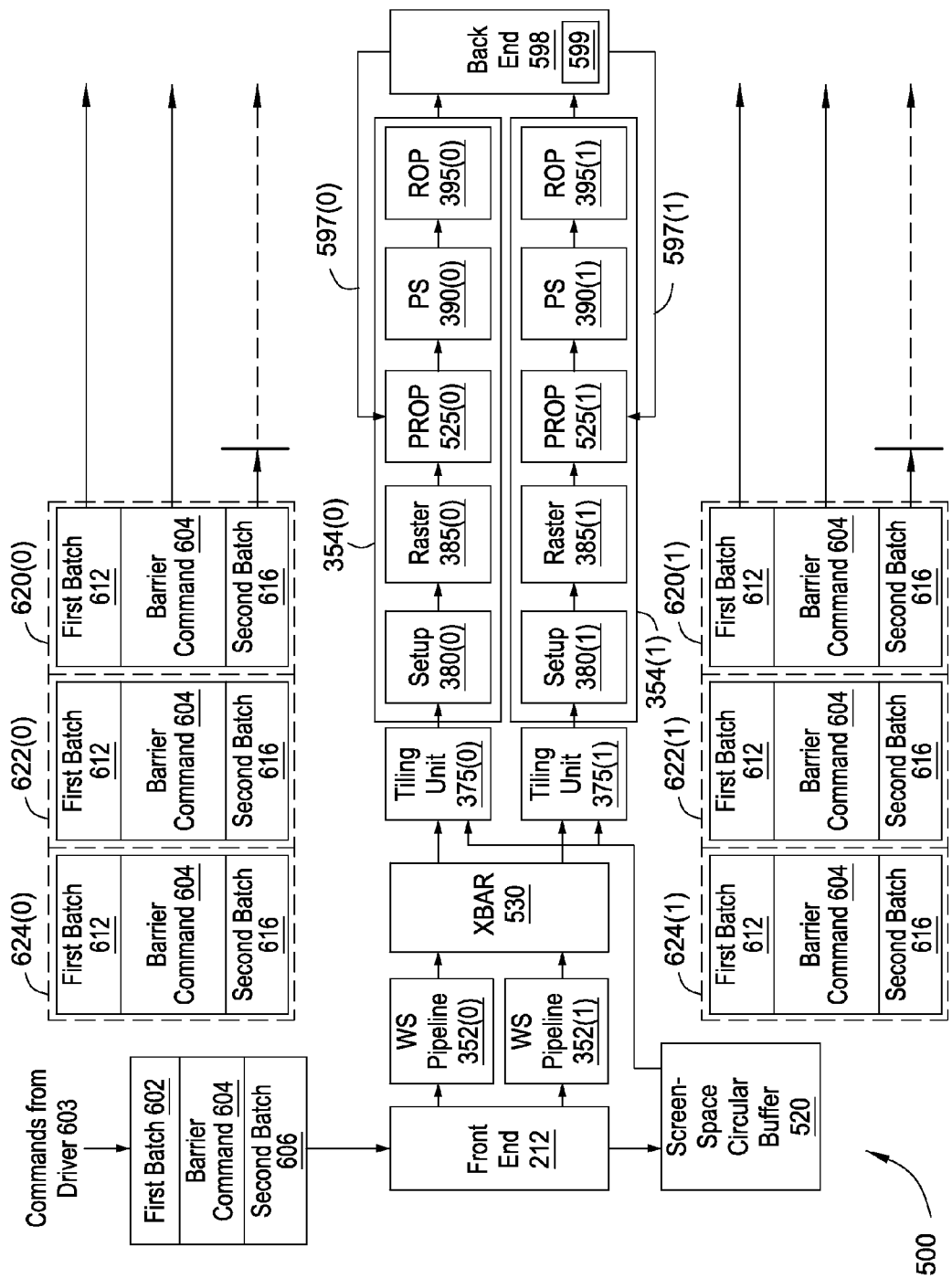
FIG. 6 illustrates a graphics subsystem configured to implement tiled barrier functionality, according to another embodiment of the present invention.

FIG. 6 illustrates a graphics subsystem 600 configured to implement tiled barrier functionality, according to another embodiment of the present invention. As shown, the graphics subsystem 600 includes a front end unit 212, a first world-space pipeline 352(0), a second world-space pipeline 352(1), a crossbar 530 ("XBAR"), a first tiling unit 375(0), a second tiling unit 375(1), a first screen-space pipeline 354(0), a second screen-space pipeline 354(1), and a back-end unit 598.

The units depicted in FIG. 6 function in a similar manner as the units described with respect to FIG. 5. Thus, front end unit 212 receives the first batch of commands 602, the tiled barrier command 604, and the second batch of commands 606, and in response causes the first world space pipeline 352(0) and the second world space pipeline 352(1) to generate primitives associated with both the first batch of commands 602 and the second batch of commands 606. As in FIG. 5, the world space pipelines 352 determine which screen-space pipelines 354 should receive the generated primitives and transmit the primitives to the corresponding tiling unit 375.

However, in FIG. 6, the device driver 103 transmits a tiled barrier command 604, rather than a non-tiled barrier command 504, after a first batch of commands 602 and before a second batch of commands 606. All units except for the tiling unit 375 treat the tiled barrier command 604 in a similar manner to the manner in which the units treat the non-tiled barrier command 504. More specifically, when a PROP unit 525 receives a tiled barrier command 604, the PROP unit 525 sets a barrier flag. The PROP unit 525 prevents work from proceeding until the barrier flag is reset. The back-end unit 599 includes a barrier command counter 599 for maintaining a count of the tiled barrier commands 604 received by the back-end unit 598.

The difference between the non-tiled barrier command 504 and the tiled barrier command 604 is in what steps the tiling unit 375 takes in response to receiving the tiled barrier command 604. The tiling unit 375 does not flush in response to receiving the tiled barrier command 604. Instead, when the tiling unit receives the tiled barrier command 604, the tiling unit 375 continues to accept primitives from the world-space pipeline 352 until the tiling unit 375 flushes for some other reason (for example, in response to resource counters in the tiling 375 unit indicating that a resource threshold is exceeded).

When a tiling unit 375 flushes, the tiling unit 375 iterates through all of the cache tiles 410, and for each cache tile 410, transmits a cache tile batch that includes all primitives that overlap the cache tile 410 to the corresponding screen-space pipeline 354. The tiling unit 375 continues to transmit cache tile batches in this manner for all cache tiles 410 associated with a render target.

The tiling unit 375 includes the tiled barrier command 604 in each of the cache tile batches that the tiling unit 375 generates. Within each cache tile batch, the tiling unit 375 places the tiled barrier command 604 after primitives associated with the first batch of commands 602, but before primitives associated with the second batch of commands 606.

When each cache tile batch proceeds down the screen-space pipeline 354, work associated with the first batch of primitives 612 proceeds down the pipeline without being stopped by the PROP unit 525. The tiled barrier command 604 in each cache tile batch proceeds down the pipeline after the work associated with the first batch of primitives 612. When the tiled barrier command 604 reaches PROP 525, PROP 525 sets a barrier flag associated with the cache tile that is associated with the tiled barrier command 604. When work associated with the second batch of primitives 616 and associated with the cache tile for which a barrier flag is set arrives at PROP 525, PROP 525 causes that work to not proceed past PROP 525 because the barrier flag is set.

For each cache tile, the barrier command counter 599 in the back-end unit 598 counts the number of tiled barrier commands 604 received by the back-end unit 598 corresponding to that cache tile. When the number of barrier commands received by the back-end unit 598 for any particular cache tile is equal to the number of screen-space pipelines 354, then the back-end unit 599 transmits a release signal, through feedback pathway 597, to first PROP unit 525(0) and second PROP unit 525(1).

The release signal causes each PROP unit 525 to reset a barrier flag corresponding to the cache tile for which the release signal was sent. Subsequently, the PROP unit 525 allows work associated with the second batch 616, and associated with that cache tile, to proceed past PROP 525.

When a tiling unit 375 flushes, the tiling unit 375 generates a cache tile batch that includes a tiled barrier command 604 for each cache tile, even if the cache tile batch has no primitives. Generating barrier commands in this manner allows the number of tiled barrier commands 604 received by the back-end unit 598 to be equal to the number of tiling units 375, even if a particular cache tile batch has no primitives.

FIG. 6 depicts several cache tile batches, including cache tile batch 620(0), cache tile batch 622(0), cache tile batch 624(0), cache tile batch 620(1), cache tile batch 622(1), and cache tile batch 624(1). Cache tile batch 620(0), cache tile batch 622(0), and cache tile batch 624(0) are generated by first tiling unit 375(0). Cache tile batch 620(1), cache tile batch 622(1), and cache tile batch 624(1) are generated by second tiling unit 375(1). Cache tile batch 620(0) and cache tile batch 620(1) include primitives that overlap a first cache tile. Cache tile batch 622(0) and cache tile batch 622(1) include primitives that overlap a second cache tile. Cache tile batch 624(0) and cache tile batch 624(1) include primitives that overlap a third cache tile.

Each cache tile batch includes a first batch of primitives 612 that includes primitives associated with the first batch of commands 602, a tiled barrier command 604, and a second batch of primitives 616 that includes primitives associated with the second batch of commands 606. For each cache tile batch, the first batch of primitives 612 and the tiled barrier command 604 proceed past PROP 525 while the second batch of primitives 616 is stopped at PROP 525 until all tiled barrier commands 604 for that particular cache tile have reached the back-end unit 598.

Figure 7:
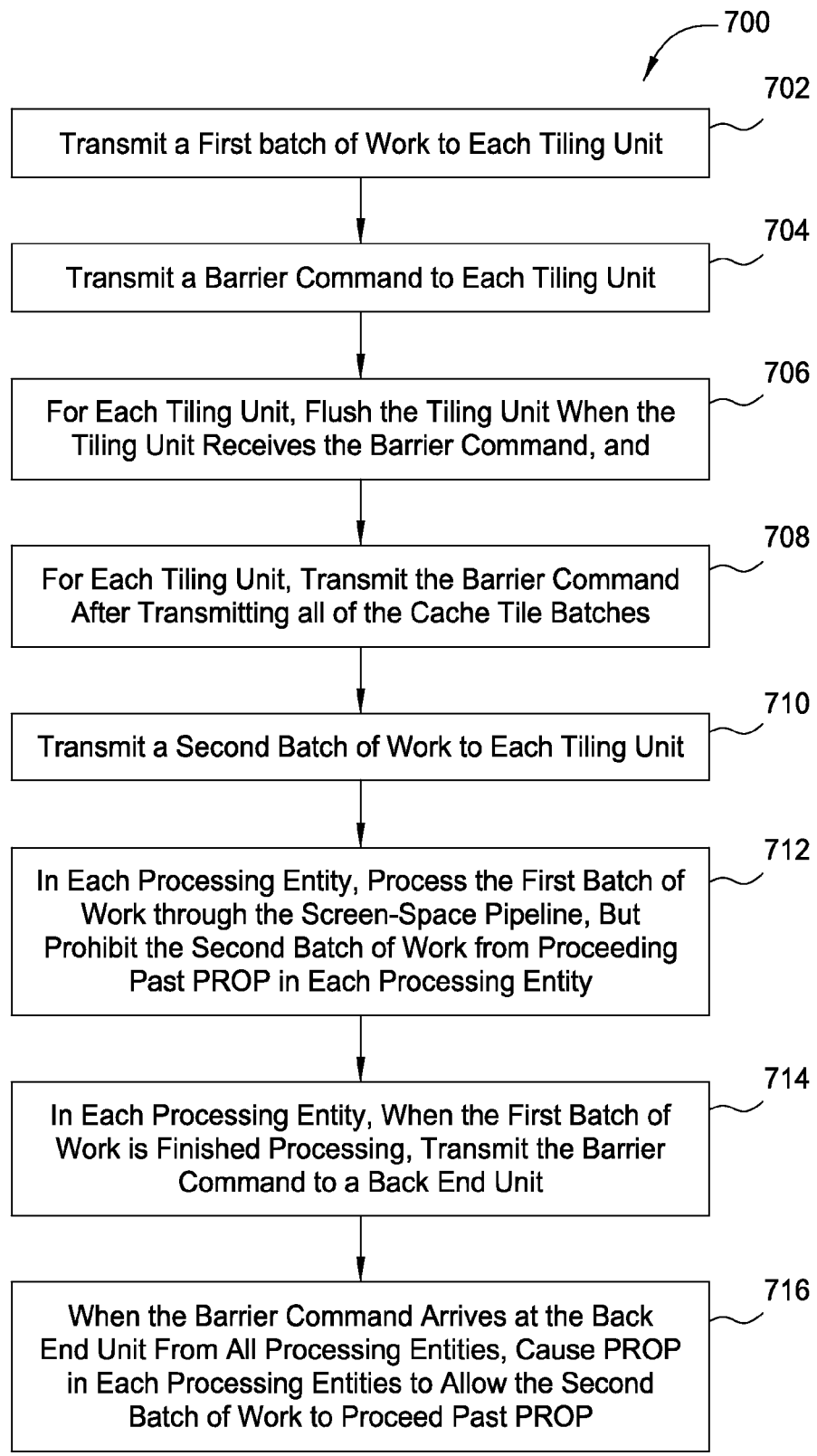
FIG. 7 is a flow diagram of method steps for processing work that includes a non-tiled barrier command, according to one embodiment of the present invention.

FIG. 7 is a flow diagram of method steps for processing work that includes a non-tiled barrier command, according to one embodiment of the present invention. Although the method steps are described in conjunction with FIGS. 1-5, persons skilled in the art will understand that any system configured to perform the method steps, in any order, falls within the scope of the present invention.

As shown, a method 700 begins in step 702, where a crossbar unit 530 transmits work to a first tiling unit 375(0) and a second tiling unit 375(1). The work transmitted to the first tiling unit 375(0) includes a first batch of work 512(0) that includes primitives associated with a first batch of commands 502 transmitted from device driver 103. The work transmitted to the second tiling unit 375(1) includes a first batch of work 512(1) that also includes primitives associated with the first batch of commands 502.

In step 704, the screen-space circular buffer 520 transmits a non-tiled barrier command 504 to both the first tiling unit 375(0) and to the second tiling unit 375(1). Tiling unit 375(0) receives a first copy of the barrier command 504(0), and tiling unit 375(1) receives a second copy of the barrier command 504(1).

In step 706, the first tiling 375(0) flushes when the first tiling unit 375(0) receives the first copy of the barrier command 504(0). The second tiling unit 375(1) also flushes when the second tiling unit 375(1) receives the second copy of the barrier command 504(1). As stated above, flushing causes the tiling units 375 to reorder the primitives that are in the tiling units 375 into cache tile batches. The tiling units transmit the cache tile batches to the corresponding screen-space pipeline 354.

In step 708, each tiling unit 375 transmits the barrier command 504 to the screen-space pipeline 354. In step 710, the world-space pipelines 352 transmit a second batch of work to each tiling unit 375. In step 710, each screen-space pipeline processes the first batch of work until that first batch of work has completed processing. In step 712, when a screen-space pipeline finishes processing the first batch of work, that screen-space pipeline transmits the non-tiled barrier command 504 to the back-end unit 598.

When all processing entities have finished processing their corresponding first batches of work, then all processing entities forward the barrier command 504 to the back-end unit 598. The back-end unit 598 keeps track, in barrier command counter 599, of how many barrier commands the back-end unit 598 receives. In step 714, when the back-end unit 598 receives a number of barrier commands equal to the number of screen-space pipelines, then the back-end unit 598 transmits a barrier release signal through feedback pathway 597, to all of the PROP units 525. When the PROP units 525 receive the barrier release signal, the PROP units 525 allow work associated with the second batch of primitives 516 to proceed past the PROP unit 525.

Figure 8:
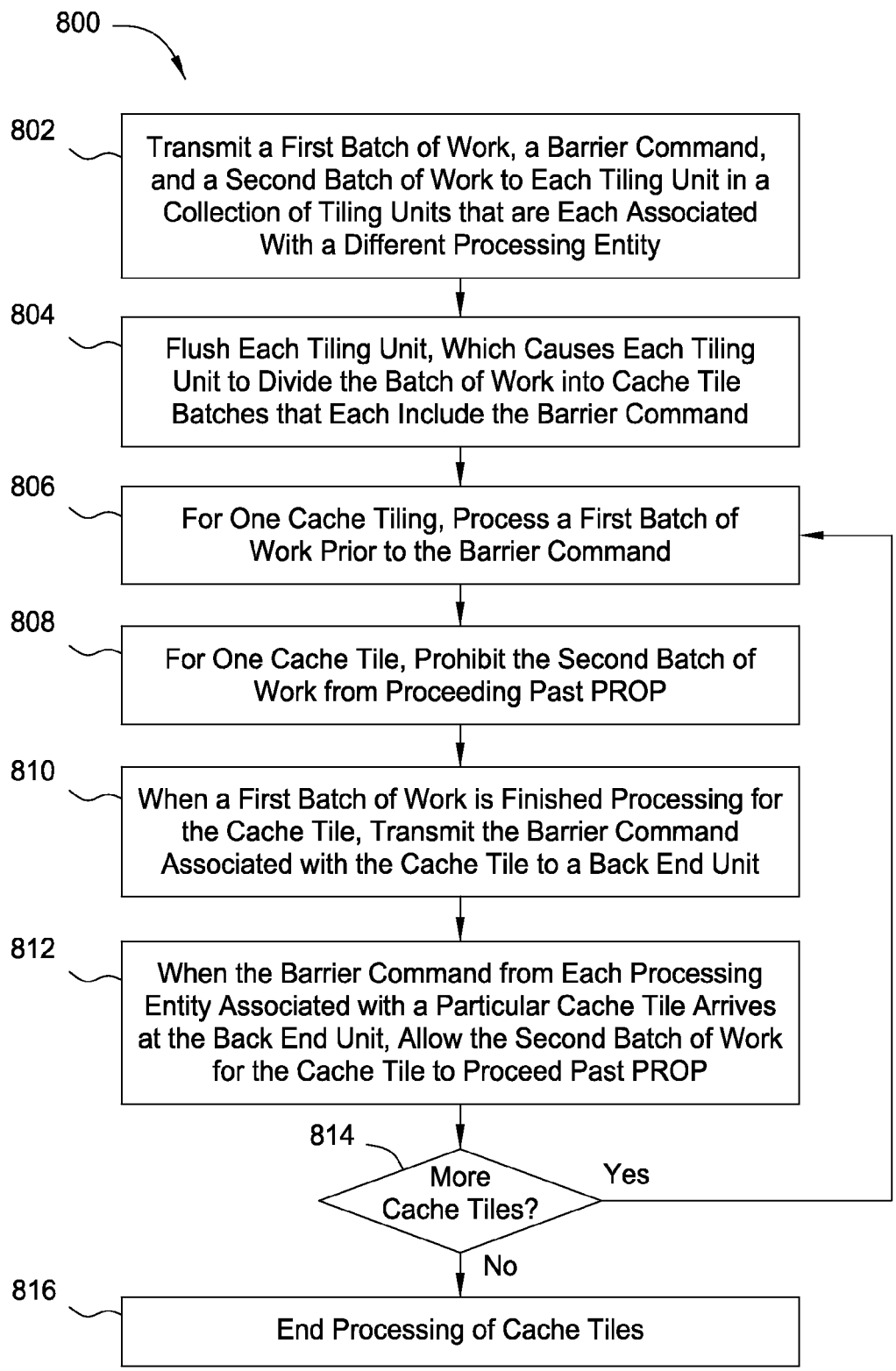
FIG. 8 is a flow diagram of method steps for processing work that includes a tiled barrier command, according to another embodiment of the present invention.

FIG. 8 is a flow diagram of method steps for processing work that includes a tiled barrier command, according to one embodiment of the present invention. Although the method steps are described in conjunction with FIGS. 1-4 and 6, persons skilled in the art will understand that any system configured to perform the method steps, in any order, falls within the scope of the present invention.

As shown, a method 800 begins at step 802, where world-space pipelines 352 transmit, through crossbar 530, a first batch of work and a second batch of work to tiling units 375. The screen-space circular buffer 520 transmits the barrier command to the tiling units 375 so that the barrier command is received after the first batch of work and before the second batch of work.

In step 804, each tiling unit 375 flushes. The tiling units flush when, for example, a resource counter indicates that a resource threshold has been exceeded. When one tiling unit 375 flushes while storing a tiled barrier command 604, that tiling unit 375 divides the primitives present in the tiling unit 375 into cache tile batches, where each cache tile batch includes the tiled barrier command 604. The cache tile batches may also include primitives associated with either or both of the first batch of work and the second batch of work, depending on whether the primitives in the first batch of work and the second batch of work intersect with the cache tile associated with the cache tile batch. The tiling units 375 transmit each of the cache tile batches to the screen-space pipeline 354 for processing.

In step 806, the screen-space pipeline 354 processes each of the cache tile batches. For each cache tile batch, the screen-space pipeline 354 processes the work associated with the first batch of primitives. The screen-space pipeline 354 also allows work associated with the second batch of primitives to proceed through the screen-space pipeline 354 until the work reaches the PROP unit 525. In step 808, for each cache tile, the PROP unit 525 prohibits work associated with the second batch of work from proceeding past the PROP 525 unit.

In step 810, when work associated the any particular cache tile has completed processing in the screen-space pipeline 354, the barrier command for that cache tile proceeds to the back-end unit 598. In step 812, when the back-end unit 598 receives all barrier commands associated with any particular cache tile, the back-end unit 598 transmits a barrier release signal through feedback pathway 597 to the PROP unit 525. When the PROP unit 525 receives a release signal through the feedback pathway 597, the PROP unit 525 allows the work associated with that cache tile and with the second batch of work 606 to proceed past the PROP unit 525.

In sum, a graphics subsystem is disclosed that implements a non-tiled barrier command 504 and a tiled barrier command 604. For the non-tiled barrier command 504, the graphics pipeline receives first and second sets of commands from a device driver 103, and receives a non-tiled barrier command 504 after the first set of commands but before the second set of commands. The world-space pipeline processes the first and second sets of commands to generate primitives, which are then transmitted to tiling units. The tiling units generate cache tile batches for processing by screen-space pipelines.

After the tiling units 375 receive the last primitives associated with the first set of commands from the world-space pipelines, the tiling units receive the non-tiled barrier command from the screen-space circular buffer 520, which causes the tiling units to flush. Work in the screen-space pipelines associated with the first set of commands flows through the screen-space pipeline, and the non-tiled barrier command 504 follows. When the non-tiled barrier command arrives at PROP 525, PROP 525 sets a barrier flag to prevent work received after the non-tiled barrier command 504 from proceeding past PROP 525. When all of the non-tiled barrier commands 504 reach a back-end unit 598, the back-end unit 598 transmits a release signal through feedback pathway 397 that causes PROP 525 to reset the barrier flag. When the barrier flag is reset, work received by PROP 525 after the non-tiled barrier command 504 is allowed to proceed.

For the tiled barrier command 604, the tiling units 375 do not flush when the tiling units 375 receive the tiled barrier command 604. Rather, the tiling units 375 accept the tiled barrier command 604 and continue accepting primitives until the tiling units 375 flush for some other reason. When a tiling unit 375 flushes with a tiled barrier command 604 in the tiling unit 375, the tiling unit processes the primitives normally to generate cache tile batches, but includes a barrier command in each of the cache tile batches. The tiling unit 375 subsequently transmits all of the cache tile batches to the corresponding screen-space pipeline 354.

Within each cache tile batch, primitives and the tiled barrier command 604 are arranged in application programming interface (API) order, meaning that the primitives associated with the first batch of commands are before the tiled barrier command 604, which is before the primitives associated with the second batch of commands. Thus, the primitives associated with the first batch of commands are allowed to pass through PROP 525 without hindrance.

When the tiled barrier command 604 arrives at PROP 525, PROP 525 sets a barrier flag corresponding to the cache tile associated with the tiled barrier command 604. This barrier flag prevents the primitives associated with the second set of commands from proceeding past PROP 525. However, those primitives are still processed normally by all of the units prior to PROP 525. When all of the tiled barrier commands 604 from each screen-space pipeline 354 arrive at the back-end unit 599, the back-end unit transmits a barrier release signal through feedback pathway 597 to each PROP unit 525, which causes the PROP unit 525 to allow primitives associated with the second batch of commands and with the cache tile that has been released to flow past the PROP unit 525.

One advantage of the above described techniques is that the graphics pipelines are configured to honor data dependencies between different batches of work. Another advantage is that units within the graphics pipelines that are upstream of the barrier point are allowed to process work in normal course and are not stalled. Thus, some amount of work can still be processed within the different graphics pipelines while the downstream data dependencies are sorted out, thereby increasing overall processing efficiency relate to prior art approaches.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A graphics subsystem, comprising:
a back-end unit; and
a first processing entity coupled to the back-end unit and configured to:
  transmit a first barrier command to the back-end unit after processing a first initial batch of primitives, and
  process a first subsequent batch of primitives in response to receiving a release signal from the back-end unit,
wherein the back-end unit is configured to transmit the release signal to the first processing entity upon receiving the first barrier command from the first processing entity.

2. The graphics subsystem of claim 1, further comprising:
a second processing entity coupled to the back-end unit and configured to:
  transmit a second barrier command to the back-end unit after processing a second initial batch of primitives, and
  process a second subsequent batch of primitives in response to receiving the release signal from the back-end unit,
wherein the back-end unit is further configured to transmit the release signal to the second processing entity upon receiving both the first barrier command from the first processing entity and the second barrier command from the second processing entity.

3. The graphics subsystem of claim 2, wherein:
the first processing entity is configured to implement a first barrier unit that is configured to set a first barrier flag in response to receiving the first barrier command, and the second processing entity is configured to implement a second barrier unit that is configured to set a second barrier flag in response to receiving the second barrier command.

4. The graphics subsystem of claim 3, wherein:
the first barrier unit is configured to prohibit a first batch of work associated with the first subsequent batch of primitives from proceeding past the first barrier unit until the first barrier flag is reset; and
the second barrier unit is configured to prohibit a second batch of work associated with the second subsequent batch of primitives from proceeding past the second barrier unit until the second barrier flag is reset.

5. The graphics subsystem of claim 4, wherein:
the first barrier unit is further configured to reset the first barrier flag in response to receiving the release signal from the back-end unit; and
the second barrier unit is further configured to reset the second barrier flag in response to receiving the release signal from the back-end unit.

6. The graphics subsystem of claim 2, wherein:
the first barrier command comprises a first non-tiled barrier command,
the second barrier command comprises a second non-tiled barrier command; and
further comprising:
  a first tiling unit that is associated with the first processing entity and configured to:
    generate the first initial batch of primitives based on a first plurality of non-tiled primitives,
    transmit the first initial batch of primitives for processing upon receiving the first barrier command, and
    generate the first subsequent batch of primitives based on a first subsequent plurality of non-tiled primitives; and
  a second tiling unit that is associated with the second processing entity and configured to:
    generate the second initial batch of primitives based on a second plurality of non-tiled primitives,
    transmit the second initial batch of primitives for processing upon receiving the second barrier command, and
    generate the second subsequent batch of primitives based on a second subsequent plurality of non-tiled primitives.

7. The graphics subsystem of claim 2, wherein:
the first barrier command comprises a first tiled barrier command,
the second barrier command comprises a second tiled barrier command; and
further comprising:
  a first tiling unit that is coupled to the first processing entity and configured to generate first work associated with a first cache tile that includes the first initial batch of primitives, the first barrier command, and the first subsequent batch of primitives; and
  a second tiling unit that is coupled to the second processing entity and configured to generate second work associated with the first cache tile and that includes the second initial batch of primitives, the second barrier command, and the second subsequent batch of primitives.

8. The graphics subsystem of claim 7, wherein:
the first barrier unit is configured to prohibit the first work from proceeding past the first barrier unit until receiving the release signal; and the second barrier unit is configured to prohibit the second work from proceeding past the first barrier unit until receiving the release signal.

9. The graphics subsystem of claim 7, wherein:
the first tiling unit is configured to obtain the first barrier command from a memory buffer; and
the second tiling unit is configured to obtain the second barrier command from the memory buffer.

10. The graphics subsystem of claim 3, wherein:
the first barrier unit comprises a first pre-raster-operations unit; and
the second barrier unit comprises a second pre-raster-operations unit.

11. The graphics subsystem of claim 1, wherein the back-end unit is further configured to maintain a barrier command count that indicates a number of barrier commands received from a set of processing entities within the graphics subsystem configured to transmit barrier commands to the back-end unit.

12. The graphics subsystem of claim 11, wherein the back-end unit is further configured to determine when the barrier command count indicates that the number of barrier commands received is equal to a number of processing entities included in the set of processing entities, and in response, transmit the release signal to the first processing entity and to the second processing entity.

13. A computing device, comprising:
a graphics subsystem, comprising:
  a back-end unit; and
  a first processing entity coupled to the back-end unit and configured to:
    transmit a first barrier command to the back-end unit after processing a first initial batch of primitives, and
    process a first subsequent batch of primitives in response to receiving a release signal from the back-end unit,
  wherein the back-end unit is configured to transmit the release signal to the first processing entity upon receiving the first barrier command from the first processing entity.

14. The computing device of claim 13, wherein:
the graphics subsystem further comprises a second processing entity coupled to the back-end unit and configured to:
  transmit a second barrier command to the back-end unit after processing a second initial batch of primitives, and
  process a second subsequent batch of primitives in response to receiving the release signal from the back-end unit,
wherein the back-end unit is further configured to transmit the release signal to the second processing entity upon receiving both the first barrier command from the first processing entity and the second barrier command from the second processing entity.

15. The computing device of claim 14, wherein:
the first processing entity is configured to implement a first barrier unit that is configured to set a first barrier flag in response to receiving the first barrier command, and
the second processing entity is configured to implement a second barrier unit that is configured to set a second barrier flag in response to receiving the second barrier command.

16. The computing device of claim 15, wherein:
the first barrier unit is configured to prohibit a first batch of work associated with the first subsequent batch of primitives from proceeding past the first barrier unit until the first barrier flag is reset; and the second barrier unit is configured to prohibit a second batch of work associated with the second subsequent batch of primitives from proceeding past the second barrier unit until the second barrier flag is reset.

17. The computing device of claim 16, wherein:
the first barrier unit is further configured to reset the first barrier flag in response to receiving the release signal; and the second barrier unit is further configured to reset the second barrier flag in response to receiving the release signal.

18. The computing device of claim 14, wherein:
the first barrier command comprises a first non-tiled barrier command, the second barrier command comprises a second non-tiled barrier command, the graphics subsystem further comprises a first tiling unit that is coupled to the first processing entity and that is configured to:
 generate the first initial batch of primitives based on a first batch of initial un-tiled primitives,
 transmit the first initial batch of primitives to the first processing entity upon receiving the first barrier command, and
 generate the first subsequent batch of primitives based on a first subsequent batch of un-tiled primitives, and the graphics subsystem further comprises a second tiling unit that is coupled to the second processing entity and that is configured to:
 generate the second initial batch of primitives based on a second batch of initial un-tiled primitives,
 transmit the second initial batch of primitives to the second processing entity upon receiving the second barrier command, and
 generate the second subsequent batch of primitives based on a second subsequent batch of un-tiled primitives.

19. The computing device of claim 14, wherein:
the first barrier command comprises a first tiled barrier command, the second barrier command comprises a second tiled barrier command, the graphics subsystem further comprises a first tiling unit that is coupled to the first processing entity and that is configured to generate a first cache tile batch that corresponds to a first cache tile and that includes the first initial batch of primitives, the first barrier command, and the first subsequent batch of primitives, and the graphics subsystem further comprises a second tiling unit that is coupled to the second processing entity and that is configured to generate a second cache tile batch that corresponds to the first cache tile and that includes the second initial batch of primitives, the second barrier command, and the second subsequent batch of primitives.

20. A method for rendering graphics, comprising:
processing a first initial batch of primitives in a first processing entity;
 transmitting a first barrier command downstream after processing the first initial batch of primitives;
 processing a first subsequent batch of primitives in response to receiving a release signal in the first processing entity; and
transmitting the release signal to the first processing entity in response to receiving the first barrier command from the first processing entity.

21. The method of claim 20, further comprising:
processing a second initial batch of primitives in a second processing entity;
 transmitting a second barrier command to the back-end unit after processing the second initial batch of primitives;
 processing a second subsequent batch of primitives in response to receiving the release signal in the second processing entity;
transmitting the release signal to the second processing entity in response to receiving both the first barrier command from the first processing entity and the second barrier command from the second processing entity.

22. The method of claim 21, wherein:
the first barrier command comprises a first non-tiled barrier command,
the second barrier command comprises a second non-tiled barrier command; and
further comprising:
 generating the first initial batch of primitives based on a first plurality of non-tiled primitives;
 transmitting the first initial batch of primitives for processing upon receiving the first barrier command;
 generating the first subsequent batch of primitives based on a first subsequent plurality of non-tiled primitives;
 generating the second initial batch of primitives based on a second plurality of non-tiled primitives;
 transmitting the second initial batch of primitives for processing upon receiving the second barrier command; and
 generating the second subsequent batch of primitives based on a second subsequent plurality of non-tiled primitives.

23. The method of claim 21, wherein:
the first barrier command comprises a first tiled barrier command,
the second barrier command comprises a second tiled barrier command; and
further comprising:
 generating first work associated with a first cache tile that includes the first initial batch of primitives, the first barrier command, and the first subsequent batch of primitives; and
 generating second work associated with the first cache tile and that includes the second initial batch of primitives, the second barrier command, and the second subsequent batch of primitives.

* * * * *